United States Patent

Shattuck et al.

[11] Patent Number: 5,975,763
[45] Date of Patent: Nov. 2, 1999

[54] ROLLER THRUST BEARING HAVING IMPROVED EFFICIENCY AND REDUCED NOISE GENERATION

[75] Inventors: Charles W. Shattuck; Primo P. Gugnoni, both of Goshen; Brian H. Laskoff, Torrington; Ronald Wilcox, Harwinton, all of Conn.

[73] Assignee: The Torrington Company, Torrington, Conn.

[21] Appl. No.: 09/098,370

[22] Filed: Jun. 17, 1998

[51] Int. Cl.$^6$ ....................................................... F16C 33/58
[52] U.S. Cl. .......................... 384/450; 384/569; 384/622
[58] Field of Search ................................... 384/450, 622, 384/569, 621, 618

[56] References Cited

U.S. PATENT DOCUMENTS 529,853  11/1894  Burdick .
1,376,309  4/1921  Armstrong .
2,607,641  8/1952  Messinger .
4,368,932  1/1983  Wolzenburg .

Primary Examiner—Lenard A. Footland
Attorney, Agent, or Firm—Robert F. Palermo

[57] ABSTRACT

A roller thrust bearing having an increased efficiency and a reduced operating noise level includes a plurality of cylindrical roller elements radially oriented within a circular bearing cage which has inner and outer cage diameters and upper and lower cage surfaces. The roller elements protrude above and below the upper and lower cage surfaces, respectively, and upper and lower circular races having inner and outer diameters, are in rolling contact with the portions of the roller elements protruding above and below the upper and lower cage surfaces. The upper and lower races have features for reducing roller skidding against the races and for reducing operating noise of the thrust bearing. Another race feature allows the load carrying capacity of the bearing to vary to be proportional to the imposed load.

5 Claims, 1 Drawing Sheet

ROLLER THRUST BEARING HAVING IMPROVED EFFICIENCY AND REDUCED NOISE GENERATION

The foregoing and other aspects will become apparent from the following detailed description of the invention when considered in conjunction with the accompanying drawings.

DETAILED DESCRIPTION

In the Figures, the same numbers are used throughout to designate features which are the same in all of the embodiments illustrated. Thus, the rollers 10 and cages 20 are the same for all cases, and the only components with changing number designators are the races 30, 40, 50, 60.

Figure 1:
FIG. 1 shows a schematic elevation cross-sectional view of a roller thrust bearing of the prior art.
Figure 5A:
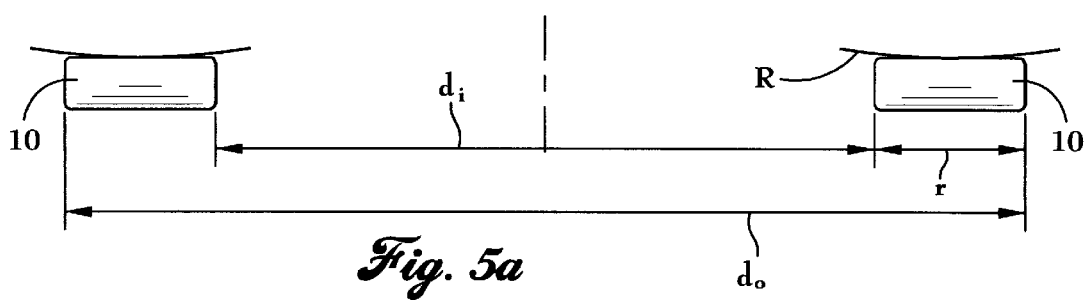
FIGS. 5a and 5b are exaggerated representations of two extremes of roller to race contact to more emphatically illustrate the improvement provided by the invention.
Figure 5B:
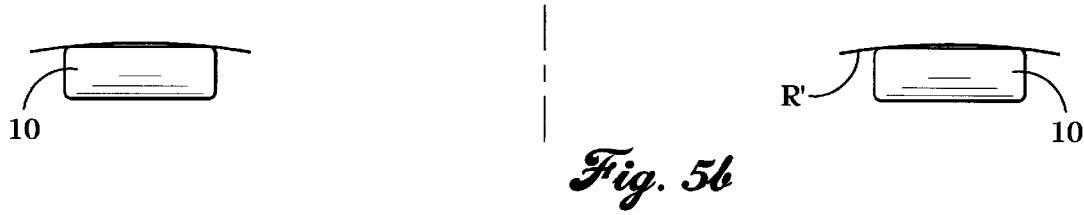

A roller thrust bearing of the prior art is illustrated schematically in FIG. 1 and, in an exaggerated fashion, in FIG. 5b. It consists of lower and upper circular races 30 supporting and supported by cylindrical rollers 10 oriented radially in a circle with an inner diameter $d_i$ and an outer diameter $d_o$ and retained in a circular roller cage 20. The outer diameter of the circle formed by the radially arrayed rollers is equal to the inner diameter plus twice the length r of the cylindrical rollers. The rollers are retained in the cage 20, in the standard manner, such that they partially protrude above and below the upper and lower surfaces, respectively, of the cage body as illustrated. It can be seen that the rollers 10 and the races 30 are in contact along substantially the entire length of the rollers 10. Since the outer circumference of the contact locus is equal to $\Pi d_o$, the inner circumference is $\Pi d_i$, and the length of the rollers 10 is r, the difference between the circumferences is equal to approximately 6r, since $d_o = d_i + 2r$. Thus, for each revolution of the circular races 30 relative to each other, the outer ends of the rollers must travel a distance 6r farther than the inner ends. Since the diameters of the rollers 10 are uniform from one end to the other, and since the rollers do not twist during rotation, the inner ends and outer ends must skid in opposite directions on the races 30 during such rotation. This creates drag, frictional efficiency losses, frictional heating and wear, and noisy operation of the bearing.

Figure 2:
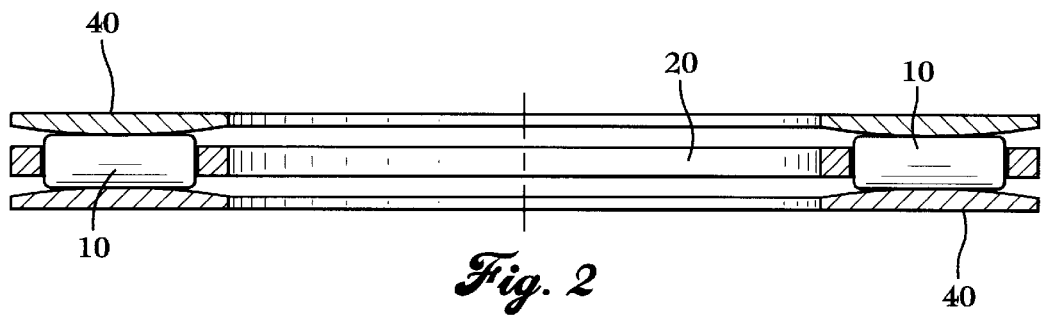
FIG. 2 shows a schematic elevation cross-sectional view of a roller thrust bearing according to one embodiment of the invention.

FIG. 2 shows a first embodiment of the invention. It includes the same cylindrical rollers 10 and the same circular roller cage 20 as the prior art bearing of FIG. 1, but it has upper and lower races 40 which have radially convex surfaces in contact with the rollers 10. As illustrated, the races 40 contact the rollers 10 only at the pitchline or midpoints of the rollers. By this means, because the race/roller contact locus is a line with small radial extent, roller skidding on the races is reduced or eliminated; friction, heating, and wear are reduced; efficiency is improved; and noise is reduced or eliminated.

Figure 3:
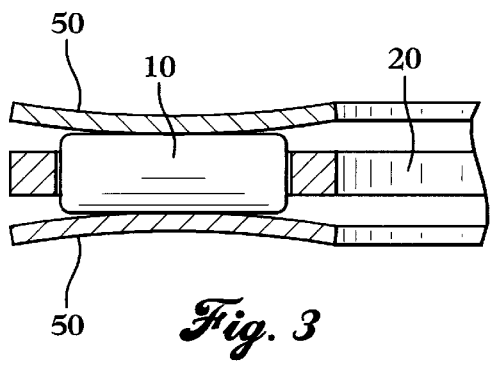
FIG. 3 shows a schematic elevation cross-sectional view of a roller thrust bearing incorporating a bearing load compliant feature according to another embodiment of the invention.

FIG. 3 shows a variant of the invention. In this case, the races 50 have substantially the same radial convexity as do races 40 of the previously described embodiment, but they are formed with uniform thickness and thus have radially concave surfaces opposite the convex surfaces which contact the rollers 10. This design permits the races 50 to deform with increasing load, such that the contact locus between the rollers 10 and races 50 has a radial extent which is proportional to the applied load, and load bearing capacity of the bearing is increased proportionally to the applied load. Although this load-proportional contact results in decreased efficiency and increased noisiness at high loads, it increases bearing life and continuously optimizes quietness and efficiency under variable loading conditions.

Figure 4:
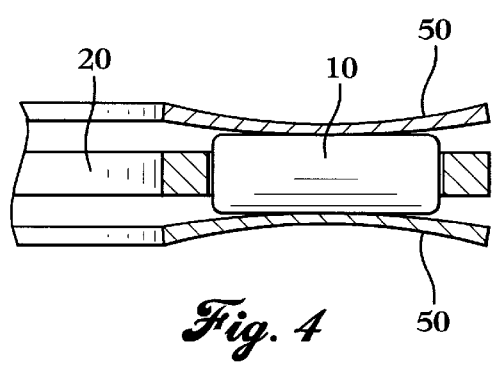
FIG. 4 shows a schematic elevation cross-sectional view of a roller thrust bearing incorporating a variable rate bearing load compliant feature according to a third embodiment of the invention.

FIG. 4 shows a further variant of the embodiment of the invention of FIG. 3. Here, the races 60 have convex surfaces in contact with the rollers 10 and concave surfaces opposite the contacting surfaces, but the thickness of the races 60 changes between the radially inner and outer edges of the races. As illustrated, the inner and outer edges of the races 60 are thicker than are the center roller-contacting portions. Thus, as the applied load increases, the races can deform to increase the roller contact area, as they can in the embodiment of FIG. 3. However, because of the thicker inner and outer edges of the races, the deformation rate becomes less as the load gets larger. This is similar to a variable rate spring.

A further variation of this variable rate feature (not illustrated) is provided by a smoothly increasing thickness of the races between the inner and outer edges of the races, in either direction, and an appropriately non-uniform radial convexity on the contacting surface of the races. In this embodiment, the continuously increasing race thickness and the non-uniform radial convexity permit a race/roller contact locus which is a line at either the inner or outer ends of the rollers at zero or low load. The locus is a path which broadens, outwardly or inwardly from the inner or outer ends of the rollers, at a decreasing or increasing spring rate, depending upon the direction of race thickness increase and the choice of zero-load race/roller contact locus.

The representations of FIGS. 5a and 5b exaggerate the solution in FIG. 5a to the problem in FIG. 5b. The sketch in b schematically shows a race R' which is in contact with rollers 10 at the radially inner and outer ends of the rollers. While this is an unlikely design choice, it is a situation which can occur in a prior art bearing, such as is illustrated in FIG. 1, under high load conditions. This is the condition under which roller skidding is maximized and under which efficiency losses, frictional heating, wear, and operating noise are also maximized.

The bearing represented in FIG. 5a has a race R with a convex roller contact surface according to the invention. It is intended to show the race/roller contact locus at approximately the radial midpoints of the rollers 10. This is the preferred embodiment of the invention; because it places the load at the center of the rollers 10 under zero load for the bearings shown in FIGS. 2 and 3, and, in the variant of FIG. 3, distributes increasing loads substantially uniformly inboard and outboard of the zero-load race/roller contact locus. This solution minimizes rollers 10 skidding on the races R at every load. At low loads there is virtually no skidding to be detected.

Having described the invention, we claim:

1. A roller thrust bearing, comprising:

a plurality of cylindrical roller elements radially oriented within a circular bearing cage which has inner and outer cage diameters and upper and lower cage surfaces, said roller elements protruding above and below said upper and lower cage surfaces, respectively;

upper and lower circular races having inner and outer diameters, said races being in rolling contact with the portions of said roller elements protruding above and below said upper and lower cage surfaces, respectively; and means, on said upper and lower races, for reducing roller skidding against said races and for reducing operating noise.

2. The roller thrust bearing of claim 1, wherein the means for reducing roller skidding against said races and for reducing operating noise comprises a radially convex surface between the inner and outer diameters of the upper and lower races on the surfaces of the races in contact with said roller elements, said radially convex surfaces contacting said roller elements at radially intermediate portions of said roller elements.

3. The roller thrust bearing of claim 2, further comprising:

means, on said upper and lower races, for causing the load carrying capacity of said thrust bearing to adjust to be proportional to the load imposed on said bearing.

4. The roller thrust bearing of claim 3, wherein the means for causing the load carrying capacity of said thrust bearing to adjust comprises a substantially uniform thickness of said races, said uniform thickness permitting the race to elastically deform to accommodate the imposed load.

5. The roller thrust bearing of claim 3, wherein the means for causing the load carrying capacity of said thrust bearing to adjust comprises a radially non-uniform thickness of said races, said radially non-uniform thickness providing a spring rate which increases with an increase of elastic deformation of said races under load.

* * * * *